(12) United States Patent
Tsuda

(10) Patent No.: US 9,703,163 B2
(45) Date of Patent: Jul. 11, 2017

(54) LIQUID CRYSTAL DISPLAY

(71) Applicant: Japan Display Inc., Minato-ku (JP)

(72) Inventor: Hiroki Tsuda, Tokyo (JP)

(73) Assignee: Japan Display Inc., Minato-ku (JP)

( * ) Notice: Subject to any disclaimer, the term of this patent is extended or adjusted under 35 U.S.C. 154(b) by 39 days.

(21) Appl. No.: 14/822,245

(22) Filed: Aug. 10, 2015

(65) Prior Publication Data
US 2016/0041445 A1 Feb. 11, 2016

(30) Foreign Application Priority Data

Aug. 11, 2014 (JP) ................. 2014-163599

(51) Int. Cl.
G02F 1/1335 (2006.01)
G02F 1/1362 (2006.01)
G02F 1/1333 (2006.01)

(52) U.S. Cl.
CPC .... *G02F 1/136286* (2013.01); *G02F 1/13338* (2013.01)

(58) Field of Classification Search
CPC ........... G02F 1/136286; G02F 1/13338; G06F 3/044; G06F 3/0412
See application file for complete search history.

(56) References Cited

U.S. PATENT DOCUMENTS

| | | | |
|---|---|---|---|
| 2012/0327353 A1 | 12/2012 | Doi et al. | |
| 2013/0128174 A1* | 5/2013 | Kimura | G02F 1/134363 349/43 |
| 2013/0162570 A1* | 6/2013 | Shin | G06F 3/041 345/173 |

FOREIGN PATENT DOCUMENTS

JP 2013-007769 1/2013

* cited by examiner

*Primary Examiner* — Nathanael R Briggs
(74) *Attorney, Agent, or Firm* — Oblon, McClelland, Maier & Neustadt, L.L.P.

(57) ABSTRACT

According to one embodiment, a liquid crystal display device includes a first substrate including gate lines having a first line width, source lines having a second line width, a common electrode, a sensor electrode formed on the common electrode and having a third line width immediately above the gate lines and a fourth line width less than the second line width immediately above the source lines, and pixel electrodes, a second substrate opposing the first substrate, and a liquid crystal layer held between the first substrate and the second substrate.

15 Claims, 8 Drawing Sheets

LIQUID CRYSTAL DISPLAY

CROSS-REFERENCE TO RELATED APPLICATIONS

This application is based upon and claims the benefit of priority from Japanese Patent Application No. 2014-163599, filed Aug. 11, 2014, the entire contents of which are incorporated herein by reference.

FIELD Embodiments described herein relate generally to a liquid crystal display.

BACKGROUND

In recent years, liquid crystal displays to which a lateral electric field mode is applied have been put into practical use. A liquid crystal display of the lateral electric field mode comprises a pair of substrates, one of which comprises a pixel electrode and a common electrode. Such a lateral electric field mode realizes switching by rotating liquid crystal molecules in a plane parallel to a substrate, and has an advantage of enabling the widening of the viewing angle.

More recently, there has been proposed a liquid crystal display comprising a sensor configured to detect the contact or approach of an object in an active area for displaying images. A sensor electrode which forms such a sensor is located, for example, between a common electrode and a pixel electrode.

DETAILED DESCRIPTION

In general, according to one embodiment, a liquid crystal display device comprises: a first substrate comprising gate lines having a first line width, source lines intersecting the gate lines and having a second line width, switching elements electrically connected to the gate lines and the source lines, a first interlayer insulating film configured to cover the switching elements, a common electrode, a sensor electrode formed on the common electrode and having a third line width immediately above the gate lines and a fourth line width less than the second line width immediately above the source lines, pixel electrodes electrically connected to the switching elements, and a second interlayer insulating film interposed between the common electrode and the pixel electrodes; a second substrate opposing the first substrate; and a liquid crystal layer held between the first substrate and the second substrate.

According to another embodiment, a liquid crystal display device comprises: a first substrate comprising gate lines having a first line width, source lines intersecting the gate lines and having a second line width, switching elements electrically connected to the gate lines and the source lines, a first interlayer insulating film configured to cover the switching elements, a common electrode, pixel electrodes electrically connected to the switching elements, a second interlayer insulating film interposed between the common electrode and the pixel electrodes, and a sensor electrode formed between the first interlayer insulating film and the common electrode and having a third line width immediately above the gate lines and a fourth line width immediately above the source lines; a second substrate opposing the first substrate; and a liquid crystal layer held between the first substrate and the second substrate.

The embodiments will now be described in detail with reference to drawings. Note that throughout the figures, the same or similar structural members or those exhibiting the same or similar functions are designated by the same reference symbols, and unnecessary explanations therefore will not be repeated.

Figure 1:
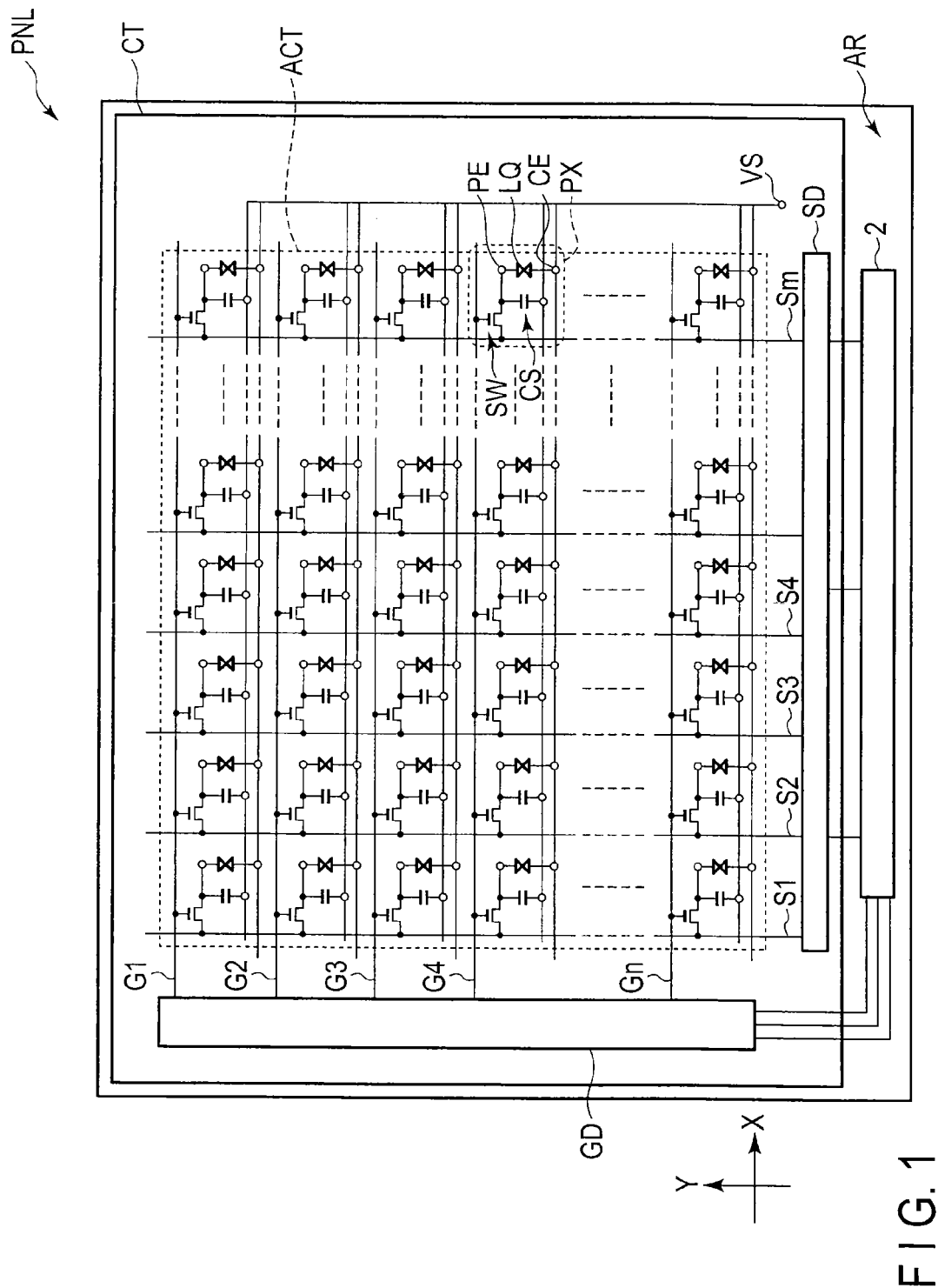
FIG. 1 is a diagram briefly showing a structure of a display panel PNL which forms a liquid crystal display of this embodiment and an equivalent circuit thereof.

FIG. 1 is a diagram briefly showing the structure of a display panel PNL which forms a liquid crystal display of this embodiment and an equivalent circuit thereof.

The liquid crystal display comprises an active-matrix type transmissive display panel PNL. The display panel PNL comprises an array substrate AR, a counter-substrate CT disposed to oppose the array substrate AR and a liquid crystal layer LQ held in a cell gap between the array substrate AR and the counter-substrate CT. The display panel PNL comprises an active area ACT configured to display images. The active area ACT comprises a number of pixels PX arranged in a matrix.

The array substrate AR comprises, in the active area ACT, gate lines G (G1 to Gn), source lines S (S1 to Sm) and the like. Each gate line G is drawn outside of the active area ACT and connected to a gate driver GD. Each source line S is drawn outside of the active area ACT and connected to a source driver SD.

Each pixel PX comprises a switching element SW, a pixel electrode PE, a common electrode CE, etc. The switching element SW is electrically connected to a respective gate line G and a respective source line S. The pixel electrode PE is electrically connected to the switching element SW in each pixel PX. The common electrode CE is electrically connected to a power supply module VS. The common electrode CE is formed in common to two or more pixels PX to oppose the respective pixel electrode PE in the active area ACT.

A storage capacitor CS is configured to hold voltage applied to the liquid crystal layer LQ for a fixed period and comprises a pair of electrodes opposing each other via an insulating film. More specifically, the storage capacitor CS comprises, for example, a first electrode of the same potential as that of the pixel electrode PE, a second electrode of the same potential as that of the common electrode CE, and an insulating film interposed between the first electrode and the second electrode.

A detailed structure of the display panel PNL will not be described here, but note that in a mode which mainly uses a vertical electric field, pixel electrodes PE are installed in an array substrate AR, whereas common electrodes CE are installed in a counter-substrate CT. Further, in a mode which mainly uses a lateral electric field, both of pixel electrodes PE and common electrodes CE are installed in an array substrate AR.

Figure 2:
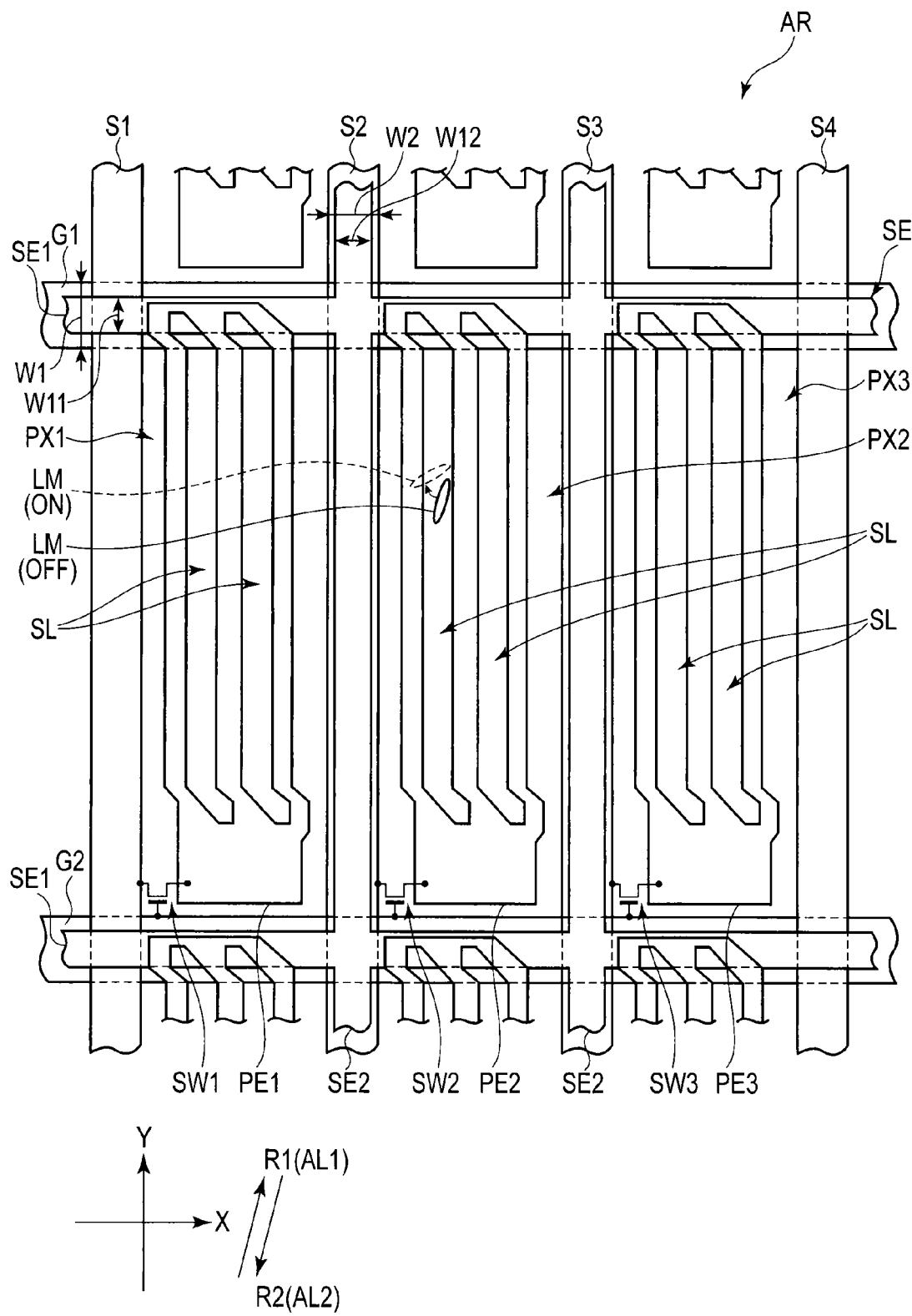
FIG. 2 is a schematic plan view of an example of the structure of pixels PX in an array substrate AR shown in FIG. 1 as viewed from a counter-substrate CT side.

FIG. 2 is a schematic plan view of an example of the structure of pixels PX in an array substrate AR shown in FIG. 1 as viewed from a counter-substrate CT side. Note that only the principal portion which requires an explanation is illustrated, and the common electrode or the like are omitted here.

The gate lines G1 and G2 each extend along a first direction X. The source lines S1 to S4 each extend along a second direction Y.

The pixels PX1 to PX3 are aligned in the first direction X. The pixel PX1 is defined by the gate lines G1 and G2 and the source lines S1 and S2. The pixel PX2 is defined by the gate lines G1 and G2 and the source lines S2 and S3. The pixel PX3 is defined by the gate lines G1 and G2 and the source lines S3 and S4. These pixels PX1 to PX3 are, for example, color pixels of colors different from each other.

The pixel PX1 comprises an island-shaped pixel electrode PE1 and a switching element SW1 electrically connected to the gate line G2 and the source line S1. The pixel electrode PE1 is electrically connected to the switching element SW1. In the example illustrated here, the pixel electrode PE1 is formed to be substantially rectangular with short sides along the first direction X and long sides along the second direction Y. The pixel electrode PE1 comprises a slit SL formed therein. The slit SL extends, for example, in the second direction Y.

Similarly, a pixel PX2 comprises an island-shaped pixel electrode PE2 and a switching element SW2 electrically connected to the gate line G2 and the source line S2. The pixel electrode PE2 is electrically connected to the switching element SW2. Further, a pixel PX3 comprises an island-shaped pixel electrode PE3 and a switching element SW3 electrically connected to the gate line G2 and the source line S3. The pixel electrode PE3 is electrically connected to the switching element SW3.

Note that the shape of the pixel electrodes PE1 to PE3 is not limited to that of the example illustrated.

Further, a sensor electrode SE is installed in the array substrate AR. In the illustrated example, the sensor electrode SE comprises first sensor elements SE1 extended in the first direction X and second sensor elements SE2 extended in the second direction Y. The first sensor elements SE1 and second sensor elements SE2 are an integral unit. The first sensor elements SE1 are located, for example, immediately above the gate lines G1 and G2. The second sensor elements SE2 are located, for example, immediately above the source lines S2 and S3. A line width W11 taken along the second direction Y of the first sensor elements SE1 is less than a line width W1 taken along the second direction Y of the gate line G1 or G2. A line width W12 taken along in the first direction X of the second sensor elements SE2 is less than a line width W2 taken along the first direction X of the source line S2 or S3. The sensor electrode SE illustrated in this example is arranged in a grid shape to surround the pixel PX2, but the layout is only an example and is not limited to the illustrated example. The sensor electrode SE is led to an outside of the active area and electrically connected to, for example, sensor circuits, provided in an exterior.

Figure 3:
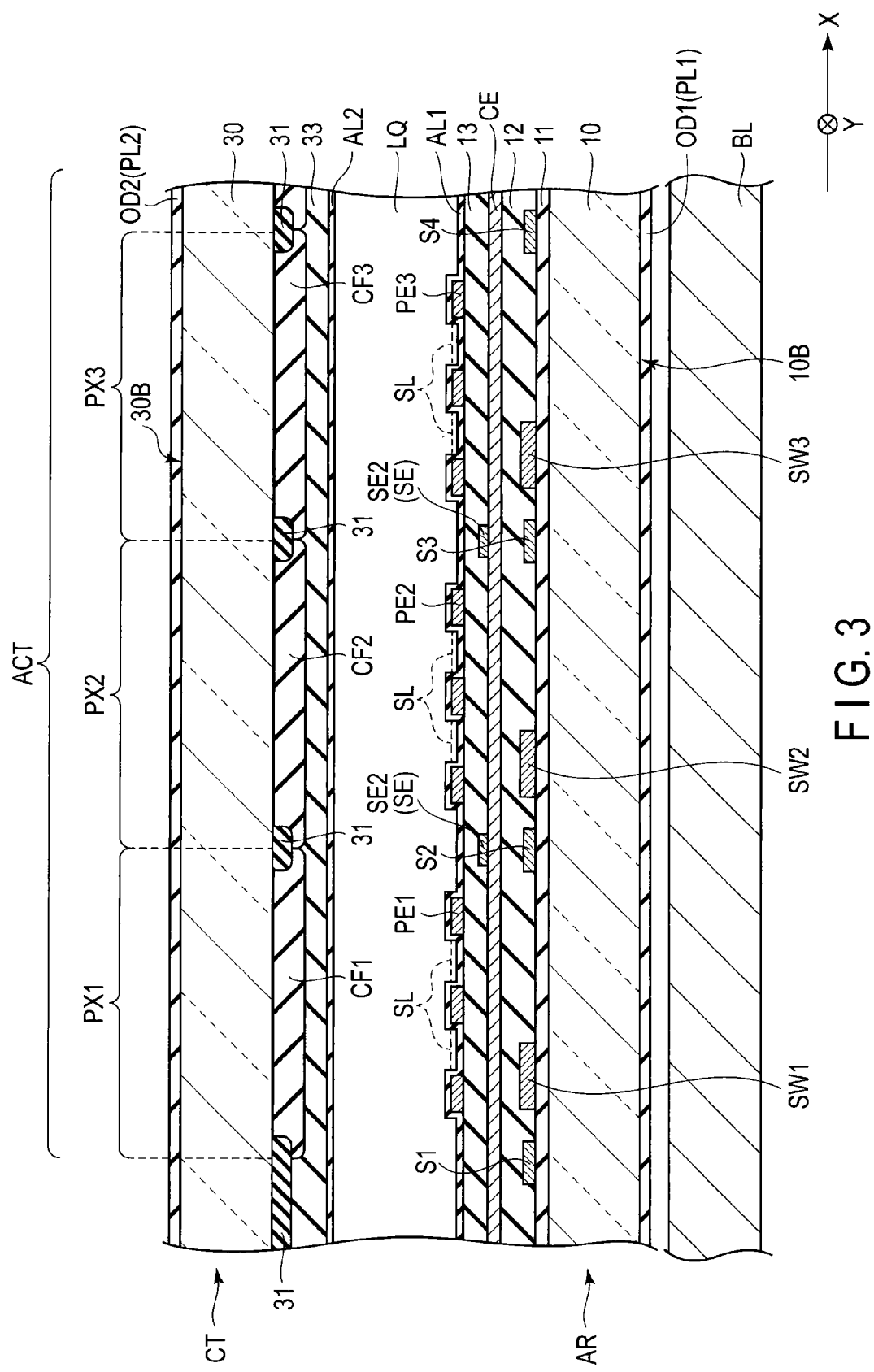
FIG. 3 is a diagram briefly showing an example of a cross-sectional structure of the display panel PNL shown in FIG. 2.

FIG. 3 is a diagram briefly showing an example of a cross-sectional structure of the display panel PNL shown in FIG. 2.

As shown, the array substrate AR is formed from a first insulating substrate 10 having light transmissivity, such as a glass substrate and a resin substrate. The array substrate AR comprises, on a side of the first insulating substrate 10, which opposes the counter-substrate CT, switching elements SW1 to SW3, source lines S1 to S4, a common electrode CE, sensor electrode SE, pixel electrodes PE1 to PE3, a first insulating film 11, a second insulating film 12, a third insulating film 13, a first alignment film AL1 and the like.

The first insulating film 11 is provided on the first insulating substrate 10. The source lines S1 to S4 are each formed on the first insulating film 11 and are covered by the second insulating film 12. The second insulating film 12 is provided also on the first insulating film 11.

The switching elements SW1 to SW3 are, for example, thin-film transistors (TFTs). The switching elements SW1 to SW3 each comprise a semiconductor layer formed of polysilicon or amorphous silicon. Note that the switching elements SW1 to SW3 may be of either a top-gate or bottom-gate type. The switching elements SW1 to SW3 are covered by the second insulating film 12. The second insulating film 12 is equivalent to a first interlayer insulating film to cover the switching elements SW1 to SW3. The second insulating film 12 is formed of, for example, an organic material such as an acrylic resin.

The common electrode CE is formed on the second insulating film 12. The common electrode CE is formed of a transparent conductive material such as indium tin oxide (ITO) or indium zinc oxide (IZO). The common electrode CE is covered by the third insulating film 13.

The sensor electrode SE is formed on the common electrode CE. In the example illustrated, the second sensor elements SE2 are formed immediately above the source lines S2 and S3. The line width of the second sensor elements SE2 is less than that of the source lines S2 and S3 as discussed above. The sensor electrode SE is formed of, for example, a metal material such as aluminum, molybdenum, tungsten or titanium. The sensor electrode SE are covered by the third insulating film 13. The third insulating film 13 is equivalent to a second interlayer insulating film to cover the common electrode CE and the sensor electrode SE. The third insulating film 13 is formed, for example, of an inorganic material such as silicon nitride.

The pixel electrodes PE1 to PE3 are each formed on the third insulating film 13 and oppose the common electrode CE with the third insulating film 13 inbetween. Further, slits SL formed in each of the pixel electrodes PE1 to PE3 also oppose the electrode CE with the third insulating film 13 inbetween. The pixel electrodes PE1 to PE3 are each formed of, for example, a transparent conductive material such as ITO or IZO. More specifically, the pixel electrode PE1 is formed in the pixel PX1, the pixel electrode PE2 is formed in the pixel PX2 and the pixel electrode PE3 is formed in the third pixel PX3. Although details are not shown here, the pixel electrode PE1 is electrically connected to the switching element SW1 through a contact hole made through the second insulating film 12, the common electrode CE and the third insulating film 13. Similarly, the pixel electrode PE2 is electrically connected to the switching element SW2 and the pixel electrode PE3 is electrically connected to the switching element SW3.

The pixel electrodes PE1 to PE3 are covered by the first alignment film AL1. The first alignment film AL1 also covers the third insulating film 13. The first alignment film AL1 is formed of a material which exhibits horizontally aligning properties and is provided on a surface of the array substrate AR, which is in contact with the liquid crystal layer LQ.

The counter-substrate CT is formed from the second insulating substrate 30 having light transmissivity, such as a glass substrate and a resin substrate. The counter-substrate CT comprises, on a side of the second insulating substrate 30, which opposes the array substrate AR, a light-shielding layer 31, color filters CF1 to CF3, an overcoat layer 33, a second alignment film AL2 and the like.

The light-shielding layer 31 partitions the pixels PX1 to PX3 in the active area ACT, and is located immediately above interconnecting parts of gate lines (not shown), the source lines S1 to S4, and the like, so as to oppose the sensor electrode. Further, the light-shielding layer 31 extends outwards from the active area ACT. Note that in the example illustrated, the sensor electrode SE is located directly under the light-shielding layer 31.

The color filter CF1 corresponds to the pixel PX1 and is arranged to oppose the pixel electrode PE1. The color filter CF2 corresponds to the pixel PX2 and is arranged to oppose the pixel electrode PE2. The color filter CF3 corresponds to the pixel PX3 and is arranged to oppose the pixel electrode PE3. A part of each of the color filters CF1 to CF3 overlaps the light-shielding layer 31. The color filters CF1 to CF3 are formed of resin material colored in three primary colors of red, blue and green, respectively. Note that a color filter of some other color, for example, white (or transparent) may be provided in addition to the three primary colors mentioned above.

The overcoat layer 33 covers the color filters CF1 to CF3. The overcoat layer 31 planarizes roughness made by the light-shielding layer 31 or the color filters CF1 to CF3. The overcoat layer 33 is formed of, for example, a transparent resin material. The overcoat layer 33 is covered by the second alignment film AL2. The second alignment film AL2 is formed of a material which exhibits horizontally aligning properties and provided on a surface of the counter-substrate CT, which is in contact with the liquid crystal layer LQ.

The array substrate AR and the counter-substrate CT, described above, are arranged so that the first alignment film AL1 and the second alignment film AL2 oppose each other. Here, between the array substrate AR and the counter-substrate CT, a predetermined cell gap is formed from a pillar-shaped spacer formed in one of these substrates. The array substrate AR and the counter-substrate CT are attached together with the cell gap formed inbetween. The liquid crystal layer LQ is formed of a liquid crystal composition containing liquid crystal molecules LM filled between the first alignment film AL1 of the array substrate AR and the second alignment film AL2 of the counter-substrate CT.

The liquid crystal layer LQ is formed of, for example, a liquid crystal material having positive (positive-type) dielectric constant anisotropy.

A backlight BL is disposed on the back side of the liquid crystal display panel LPN having the above-described structure. Various modes are applicable to the backlight BL, including a type which uses a light-emitting diode (LED) as its light source, but a description of the detailed structure of the backlight BL is omitted here.

A first optical device OD1 including a first polarizer PL1 is disposed on an outer surface 10B of the first insulating substrate 10. A second optical device OD2 including a second polarizer PL2 is disposed on an outer surface 30B of the second insulating substrate 30. The first polarization axis of the first polarizer PL1 and the second polarization axis of the second polarizer PL2 are, for example, in a crossed Nicol positional relationship in which these polarization axes are perpendicular to each other. Note that at least one of the first polarizer PL1 and the second polarizer PL2 may include a retardation film.

The first alignment film AL1 and the second alignment film AL2 are subjected to an alignment layer treatment (for example, rubbing treatment or optical alignment layer treatment) to be aligned parallel to each other in a plane parallel to the major surface of the substrate (or X-Y plane) as shown in FIG. 2. A direction R1 of the alignment layer treatment of the first alignment film AL1 and a direction R2 of the alignment layer treatment of the second alignment film AL2 intersect the second direction Y at an acute angle of 45° or less. Note that the direction R1 and the direction R2 are opposite to each other.

An example of the operation (normally black) in the liquid crystal display of the above-described structure will now be described.

In an off state in which a potential difference is not produced between the pixel electrodes PE and the common electrode CE, a voltage is not applied to the liquid crystal layer LQ. In the off state, an electric field is not produced between the pixel electrodes PE and the common electrode CE. Therefore, as indicated by the solid line in FIG. 2, the liquid crystal molecules LM contained in the liquid crystal layer LQ are aligned in an initial alignment direction regulated by the first alignment film AL1 and the second alignment film AL2 in the X-Y plane. In the off state, part of the light from the backlight unit BL is transmitted through the first polarizer PL1 and enters the display panel PNL. The light entering the display panel PNL is, for example, linearly polarized light normally intersecting the first polarization axis of the first polarizer PL1. The polarization of the linearly polarized light hardly varies when passing through the display panel LPN in an off state. Thus, the linearly polarized light emerging from the display panel LPN is absorbed by the second polarizer PL2 that is in a crossed Nicol positional relationship with respect to the first polarizer PL1 (black display).

In contrast, In an off state in which a potential difference is produced between the pixel electrodes PE and the common electrode CE, a voltage is applied to the liquid crystal layer LQ. In the on state, a lateral electric field substantially parallel to the major surface of the substrate or a fringe electric field is produced between the pixel electrodes PE and the common electrode CE. Therefore, each liquid crystal molecule LM is aligned in a direction different from the initial alignment direction in the X-Y plane, as indicated by dashed lines in FIG. 2. Here, in the case of a positive-type liquid crystal material, each liquid crystal molecule LM is aligned in a direction parallel to the electric field in the X-Y plane. Here the alignment direction of the liquid crystal molecules LM varies depending on the voltage applied to the liquid crystal layer LQ. In this on state, linearly polarized light normally intersecting the first polarization axis of the first polarizer PL1 enters the display panel PNL, and the polarization thereof varies depending on the alignment state of the liquid crystal molecules LM (or the retardation of the liquid crystal layer LQ) when the light passes through the liquid crystal layer LQ. Thus, in the on state, at least part of the light emerging from the liquid crystal layer LQ passes through the second polarizer PL2 (white display).

Further, in the liquid crystal display of this embodiment, when detecting contact or approach of an object using the sensor electrode SE, sensor circuits supply a driving signal of a predetermined wave to the sensor electrode SE. The capacitance produced between the object and the sensor electrode SE varies according to the distance between the object and the sensor electrode SE. The sensor circuits detect variation in potential of the sensor electrode SE caused by the change in capacitance between the object and the sensor electrode SE, and thus determines the position (or coordinates) on or to which the object contacts or approaches.

In this embodiment, the sensor electrode SE is narrowed into fine lines. With this structure, it is possible, when light is irradiated towards the array substrate AR from the backlight unit BL, to suppress the induction of a photocurrent in the sensor electrode SE. Therefore, it becomes possible to control the charge-up of the color filters CF1 to CF3 or the light-shielding layer 31, which oppose the sensor electrode SE. Thus, production of an undesirable vertical electric field between the array substrate AR and the counter-substrate CT can be suppressed. Consequently, the occurrence of such an alignment error, wherein liquid crystal molecules LM are caused to rise with respect to the major surface of the substrate by an undesirable vertical electric field, can be suppressed. At the same time, the reduction in modulation rate in the liquid crystal layer LQ resulting from the alignment error can be suppressed. Thus, it is possible to obtain a good display quality.

In the lateral electric field mode described above, such a structure is applied that a common electrode CE and pixel electrodes PE oppose each other with a third insulating film 13 inbetween. The third insulating film 13 is formed into a relatively thin film of an inorganic material (for example, silicon nitride), so as to produce an electric field between the common electrode CE and the pixel electrodes PE, or produce a storage capacitance CS. Thus, the third insulating film 13 cannot sufficiently cover to planarize the surface roughness of the underlying layer, and therefore the level difference between the sensor electrode SE and the common electrode CE is likely to be left untreated on the surface. However, in this embodiment, since the sensor electrode SE is formed into thin lines, the level difference caused by the sensor electrode SE is not produced further than the positions opposing the light-shielding layer 31. With this structure, even if the alignment of liquid crystal molecules is disturbed by the level difference made by the sensor electrode SE, the disturbance hardly affects the opening made on the inner side of the light-shielding layer 31 (region contributing to display). For this reason, it becomes possible to suppress the occurrence of display errors including passing-through of light, caused by the disturbed alignment of liquid crystal molecules in the peripheral portion of each pixel.

Next, a modification of this embodiment will now be described.

Figure 4:
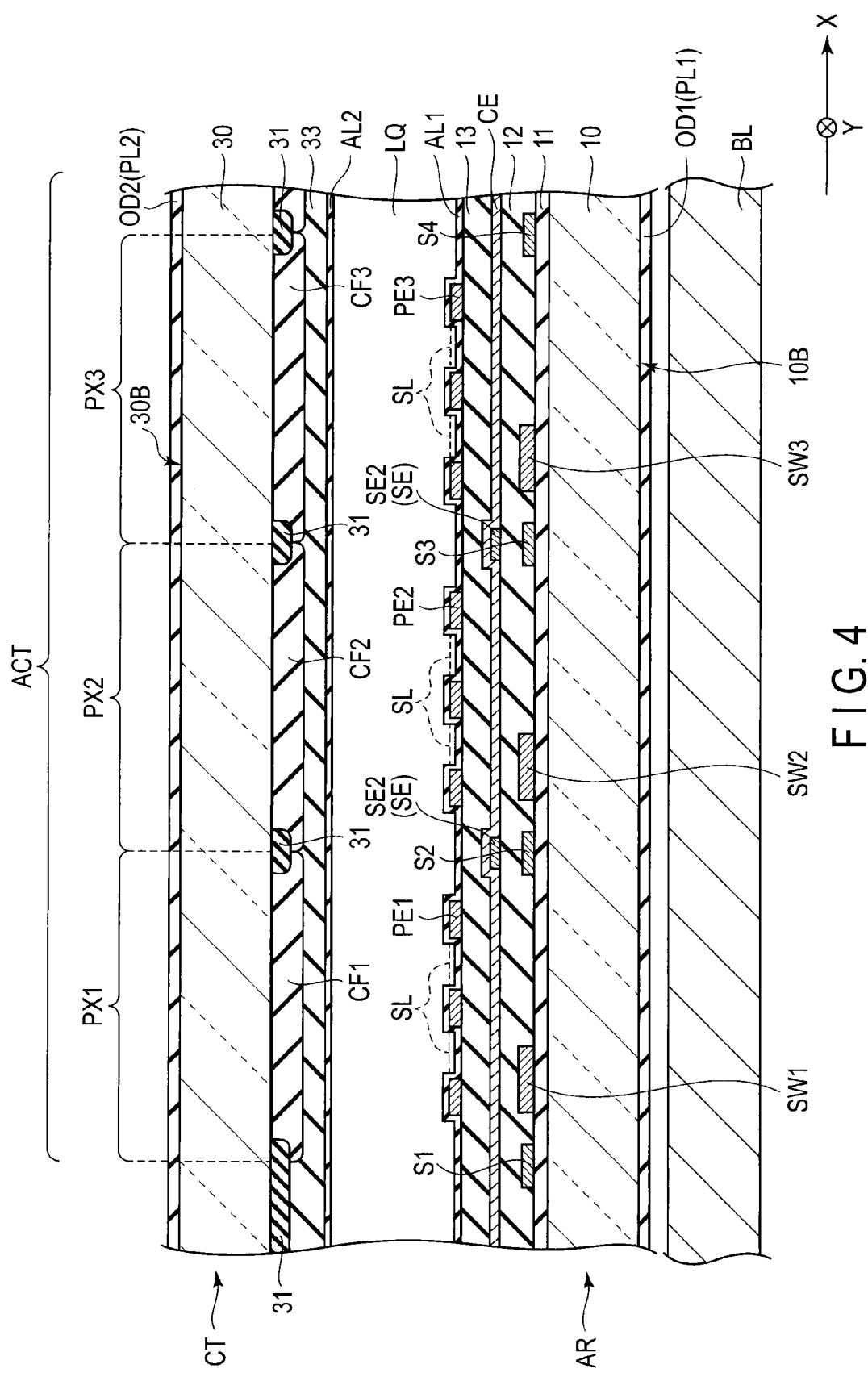
FIG. 4 is a diagram briefly showing an example of another cross-sectional structure of the display panel PNL shown in FIG. 2.

FIG. 4 briefly shows an example of another cross-sectional structure of the display panel PNL shown in FIG. 2.

The example shown in FIG. 4 differs from that of FIG. 3 in that the sensor electrode SE is formed between the second insulating film 12 and the common electrode CE. More specifically, the sensor electrode SE is formed on the second insulating film 12 and then covered by the common electrode CE. Note that FIG. 4 shows, of all the sensor electrode SE, only the second sensor elements SE2 located immediately above the source lines S2 and S3. But, naturally, the first sensor elements located immediately above the gate lines are formed on the second insulating film 12 and covered by the common electrode CE.

According to such a modification, even if a photocurrent is induced in the sensor electrode SE as light is irradiated towards the array substrate AR from the backlight unit BL, the photocurrent is absorbed or diffused by the common electrode CE covering the sensor electrode SE, before charging up the light-shielding layer 31 or the color filters CF1 to CF3 which oppose the sensor electrode SE. Thus, it is possible to suppress the charge-up of the light-shielding layer 31 or the color filters CF1 to CF3 which opposes the sensor electrode SE. In this manner, an effect similar to that of the above-described example can be obtained.

Note that in the examples shown in FIGS. 3 and 4, the pixel electrodes PE are located on the side of the liquid crystal layer LQ side with respect to the common electrode CE. But, alternatively, the common electrode CE may be located on the side of the liquid crystal layer LQ with respect to the pixel electrodes PE. In this case, slits are formed in the common electrode CE instead of in the pixel electrodes PE, and the pixel electrodes PE opposes the common electrode CE with the third insulating film 13 inbetween.

Figure 5:
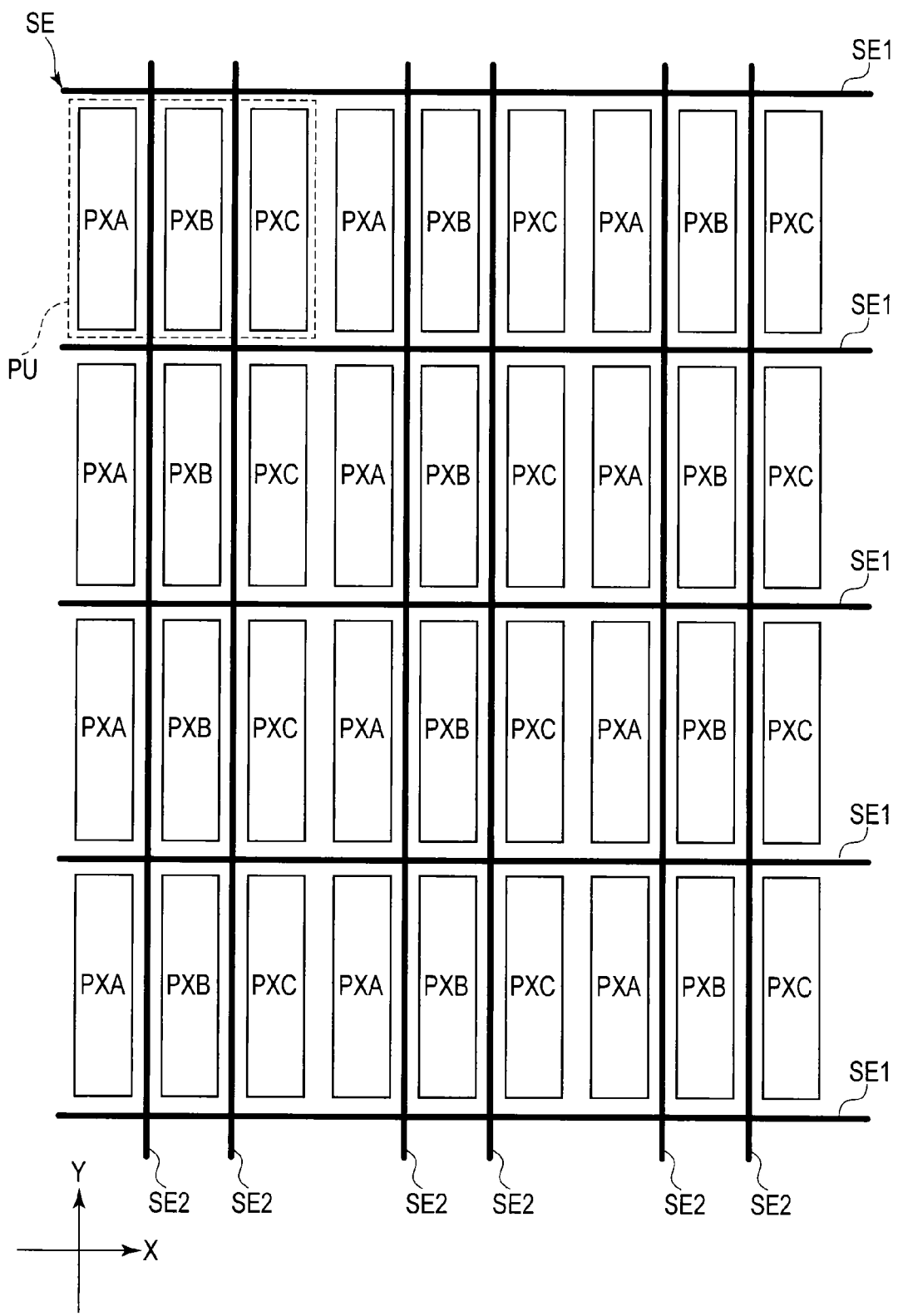
FIG. 5 is a diagram briefly showing an example of the layout of a sensor electrode SE.

FIG. 5 briefly shows an example of the layout of the sensor electrode SE.

Unit pixels for realizing color display are arranged in a first direction X and a second direction Y in a matrix. A unit pixel is a minimum unit which constitutes a color image that is displayed on the active area ACT. Each unit pixel comprises a plurality of different color pixels. In the example illustrated, each unit pixel comprises three color pixels PXA, PXB and PXC arranged in the first direction X. Note that color pixels of the same color are arranged in the second direction Y.

The sensor electrode SE of the illustrated example are formed into a grid surrounds color pixels PXB of the same color. More specifically, each first sensor elements SE1 is arranged between each pair of color pixels adjacent to each other in the second direction Y. The second sensor elements SE2 are arranged between each pair of a color pixel PXA and a color pixel PXB and also between each pair of a color pixel PXB and a color pixel PXC, but not provided between a color pixel PXA and a color pixel PXC.

With such a layout of a sensor electrode SE, it is possible to suppress the induction of a photocurrent in the color pixel PXB and its circumference, or a defect caused by the induction of the photocurrent.

Figure 6:
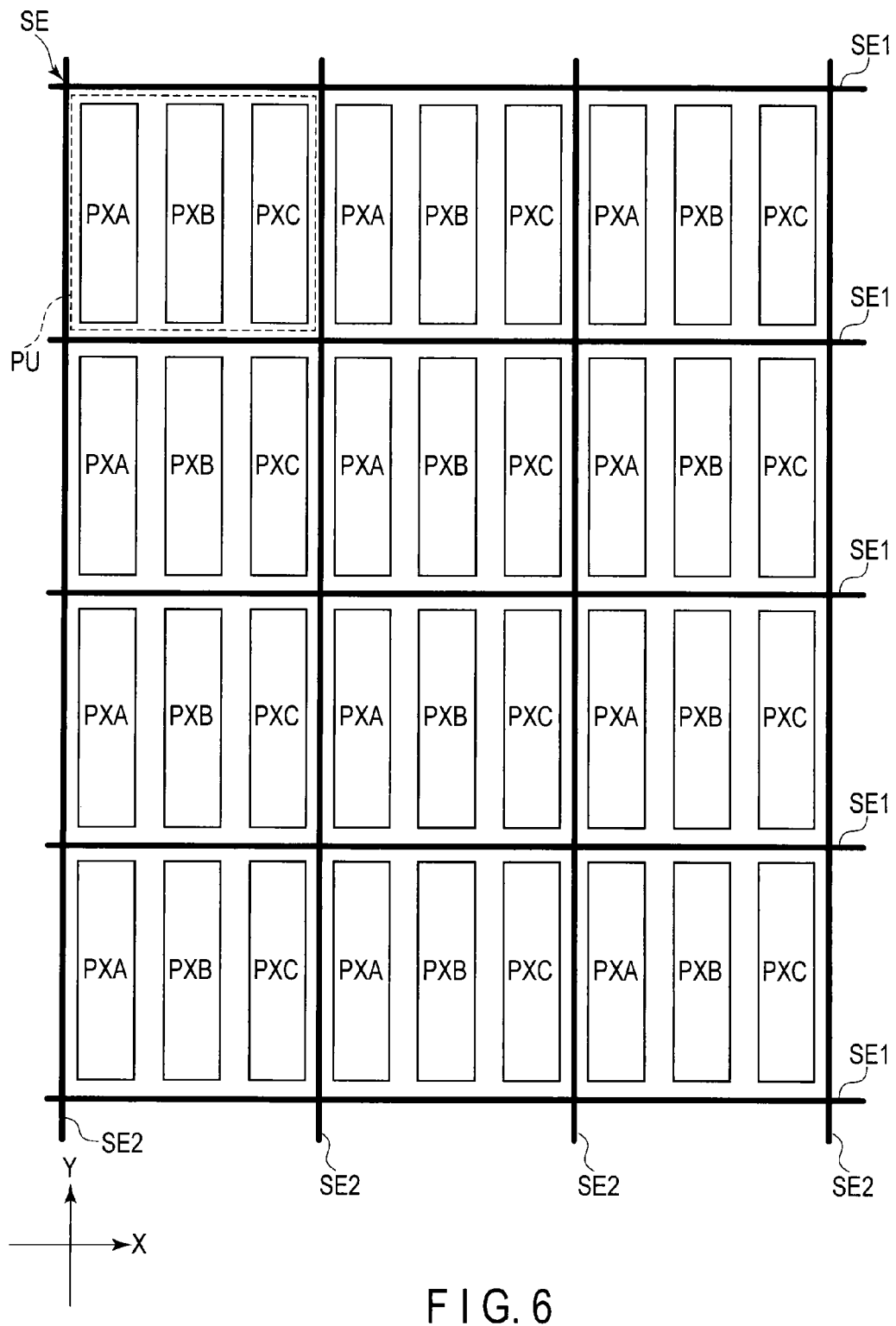
FIG. 6 is a diagram briefly showing another example of the layout of the sensor electrode SE.

FIG. 6 briefly shows another example of the layout of the sensor electrode SE.

The example illustrated here differs from that of FIG. 5 in that the sensor electrode SE is formed into a grid surrounds a unit pixel PU. More specifically, each first sensor element SE1 is provided between each pair of color pixels adjacent to each other in the second direction Y. Each second sensor element SE2 is provided between each pair of a color pixel PXA and a color pixel PXC, but not provided between each pair of color pixel PXA and color pixel PXB or between the color pixel PXB and the color pixel PXC.

According to such a layout of the sensor electrode SE, the number of the second elements SE2 which are part of the sensor electrode SE can be reduced and therefore the induction of photocurrent can be further suppressed.

Figure 7:
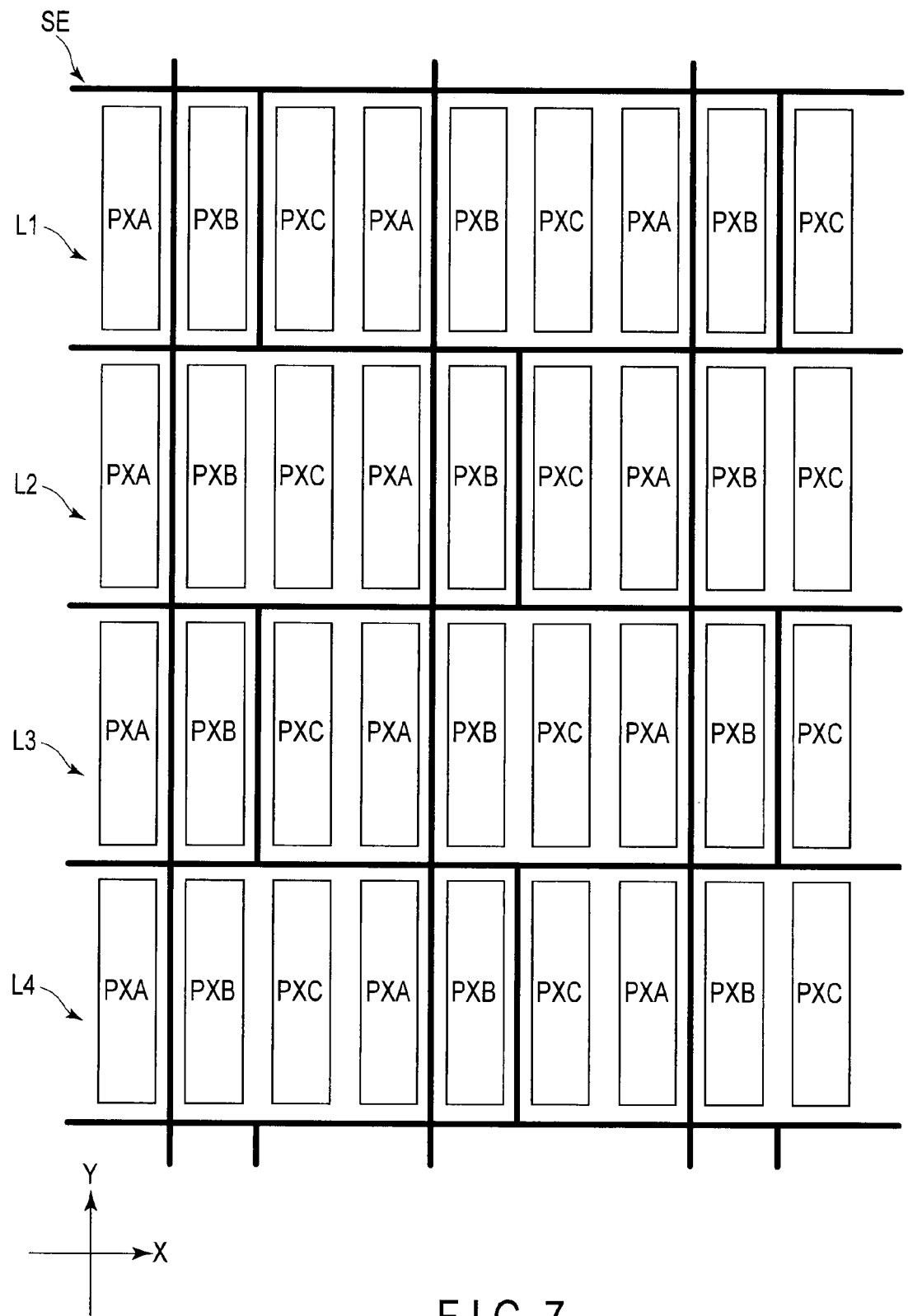
FIG. 7 is a diagram briefly showing still another example of the layout of the sensor electrode SE.

FIG. 7 briefly shows another example of the layout of the sensor electrode SE.

The example illustrated here differs from that of FIG. 5 in that the sensor electrode SE is formed to surround part of color pixels of the same color. More specifically, in the example shown in FIG. 5, the sensor electrode SE is formed to surround all the color pixels PXB, but in the example shown here, the sensor electrode SE surrounds only some of the color pixels PXB. For example, in the first pixel line L1 and the third pixel line L3, color pixels PXB located only in the odd-numbered positions, that is, the first, third, . . . , are surrounded by the sensor electrode SE. Further, in the second pixel line L2 and the fourth pixel line L4, color pixels PXB located only in the even-numbered positions, that is, the second, fourth, . . . , are surrounded by the sensor electrode SE.

According to such a layout of the sensor electrode SE, second elements SE2 which are part of the sensor electrode SE can be thinned down, and therefore the induction of a photocurrent can be further suppressed.

Figure 8:
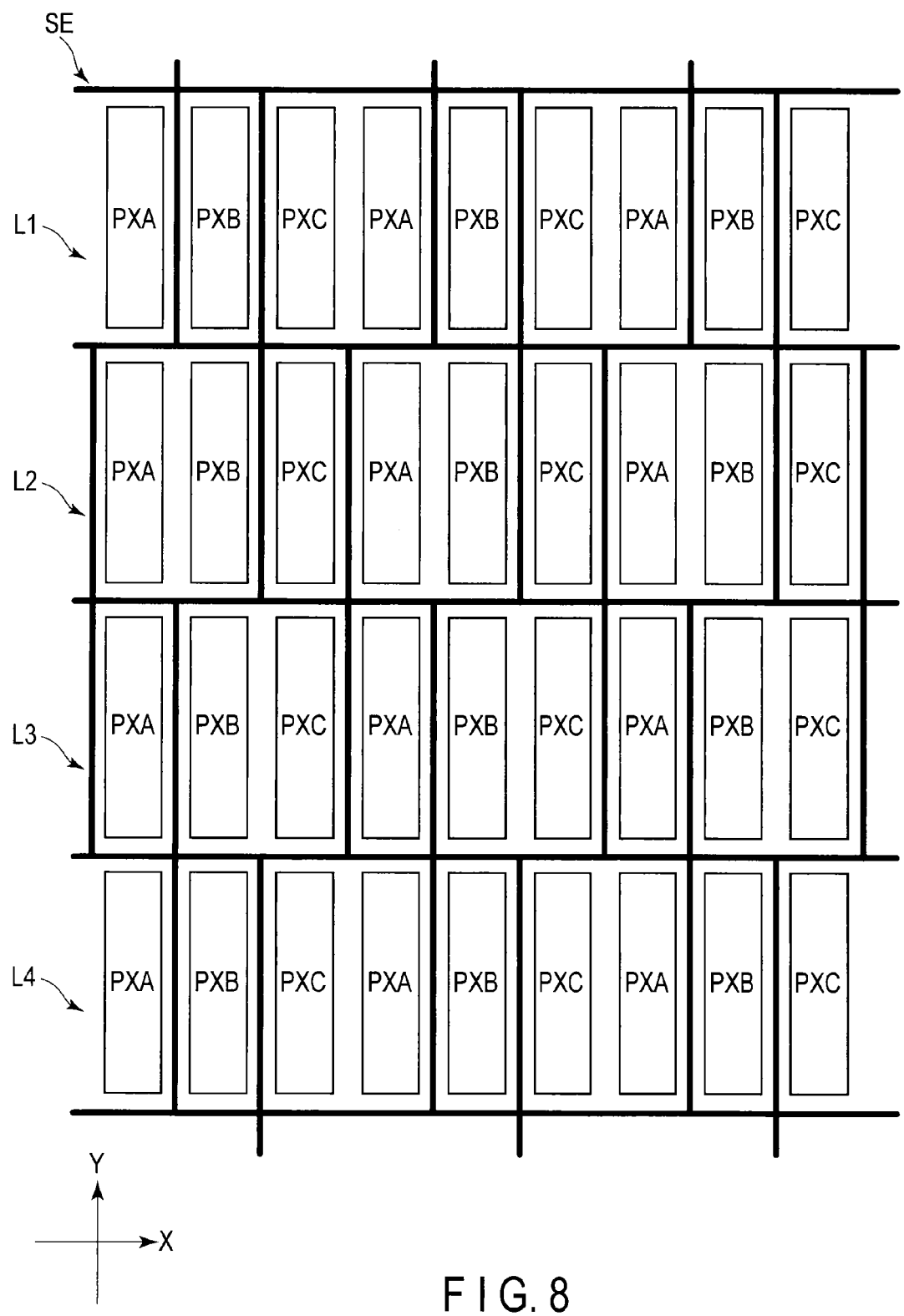
FIG. 8 is a diagram briefly showing still another example of the layout of the sensor electrode SE.

FIG. 8 briefly shows still another example of the layout of the sensor electrode SE.

The example illustrated here differs from that of FIG. 5 in that the sensor electrode SE is formed to surround different color pixels from one pixel line to another. More specifically, the sensor electrode SE is formed to surround only color pixels PXB in the first pixel line L1, only color pixels PXC in the second pixel line L2 and only color pixels PXA in the third pixel line L3.

According to such a layout of the sensor electrode SE, the induction of a photocurrent in specific color pixels and their surroundings, or a defect caused by the induction of a photocurrent can be further suppressed.

As described above, according to this embodiment, it is possible to provide a high-display-quality liquid crystal display device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
   a first substrate including
      a first insulating substrate,
      gate lines having a first line width,
      source lines crossing the gate lines and having a second line width,
      switching elements electrically connected to the gate lines and the source lines,
      a first interlayer insulating film configured to cover the switching elements,
      a common electrode on the first interlayer insulating film,
      a sensor electrode formed on the common electrode and having a third line width immediately above the gate lines and a fourth line width less than the second line width immediately above the source lines,
      a second interlayer insulating film covering the common electrode and the sensor electrode, and
      pixel electrodes on the second interlayer insulating film electrically connected to the switching elements;
   a second substrate opposing the first substrate; and
   a liquid crystal layer held between the first substrate and the second substrate,
   wherein the sensor electrode has an upper surface facing the liquid crystal layer and a lower surface facing the first insulating substrate, a whole area of the lower surface contacts with the common electrode in an active area configured to display an image, and a whole area of the upper surface contacts with the second interlayer insulating film in the active area.

2. The liquid crystal display device of claim 1, wherein the third line width is less than the first line width.

3. The liquid crystal display device of claim 1, wherein the first interlayer insulating film is formed of an organic material and the second interlayer insulating film is formed of an inorganic material.

4. The liquid crystal display device of claim 1, wherein the second substrate further comprises a color filter opposing the pixel electrode, and a light-shielding layer located immediately above the source lines and opposing the sensor electrode.

5. The liquid crystal display device of claim 1, wherein the sensor electrode comprises a first sensor element that extends along an extending direction of the gate lines and a second sensor element that extends along an extending direction of the source lines, and
   a region surrounded by first and second sensor elements includes only a single color pixel.

6. The liquid crystal display device of claim 1, wherein the sensor electrode comprises a first sensor element that extends along an extending direction of the gate lines and a second sensor element that extends along an extending direction of the source lines, and
   a region surrounded by first and second sensor elements includes only one unit pixel comprising color pixels.

7. The liquid crystal display device of claim 1, wherein the pixel electrodes each comprise a slit opposing the common electrode.

8. A liquid crystal display device comprising:
   a first substrate including
      a first insulating substrate,
      gate lines having a first line width,
      source lines crossing the gate lines and having a second line width,
      switching elements electrically connected to the gate lines and the source lines,
      a first interlayer insulating film configured to cover the switching elements,
      a sensor electrode formed on the first interlayer insulating film and having a third line width immediately above the gate lines and a fourth width immediately above the source lines,
      a common electrode formed on the first interlayer insulating film and covering the sensor electrode,
      a second interlayer insulating film covering the common electrode, and
      pixel electrodes on the second interlayer insulating film electrically connected to the switching elements;
   a second substrate opposing the first substrate; and
   a liquid crystal layer held between the first substrate and the second substrate,
   wherein the sensor electrode has an upper surface facing the liquid crystal layer and a lower surface facing the first insulating substrate, a whole area of the lower surface contacts with the first interlayer insulating film in an active area configured to display an image, and a whole area of the upper surface contacts with the common electrode in the active area.

9. The liquid crystal display device of claim 8, wherein the fourth line width is less than the second line width.

10. The liquid crystal display device of claim 8, wherein the third line width is less than the first line width.

11. The liquid crystal display device of claim 8, wherein the first interlayer insulating film is formed of an organic material and the second interlayer insulating film is formed of an inorganic material.

12. The liquid crystal display device of claim 8, wherein the second substrate further comprises a color filter opposing the pixel electrode, and a light-shielding layer located immediately above the source lines and opposing the sensor electrode.

13. The liquid crystal display device of claim 8, wherein the sensor electrode comprises a first sensor element that extends along an extending direction of the gate lines and a second sensor element that extends along an extending direction of the source lines, and a region surrounded by first and second sensor elements includes only a single color pixel formed into a grid configured to surround color pixels of the same color.

14. The liquid crystal display device of claim 8, wherein the sensor electrode comprises a first sensor element that extends along an extending direction of the gate lines and a second sensor element that extends along an extending direction of the source lines, and a region surrounded by first and second sensor elements includes only one unit pixel comprising color pixels.

15. The liquid crystal display device of claim 8, wherein the pixel electrodes each comprise a slit opposing the common electrode.

\* \* \* \* \*